J. A. FULLER.
COTTON CHOPPER.
APPLICATION FILED SEPT. 28, 1907.

911,487.

Patented Feb. 2, 1909.
2 SHEETS—SHEET 1.

Witnesses
Jas. W. McCathran
H. F. Riley

J. A. Fuller, Inventor,
By C. G. Siggers
Attorney

J. A. FULLER.
COTTON CHOPPER.
APPLICATION FILED SEPT. 28, 1907.
911,487.
Patented Feb. 2, 1909.
2 SHEETS—SHEET 2.
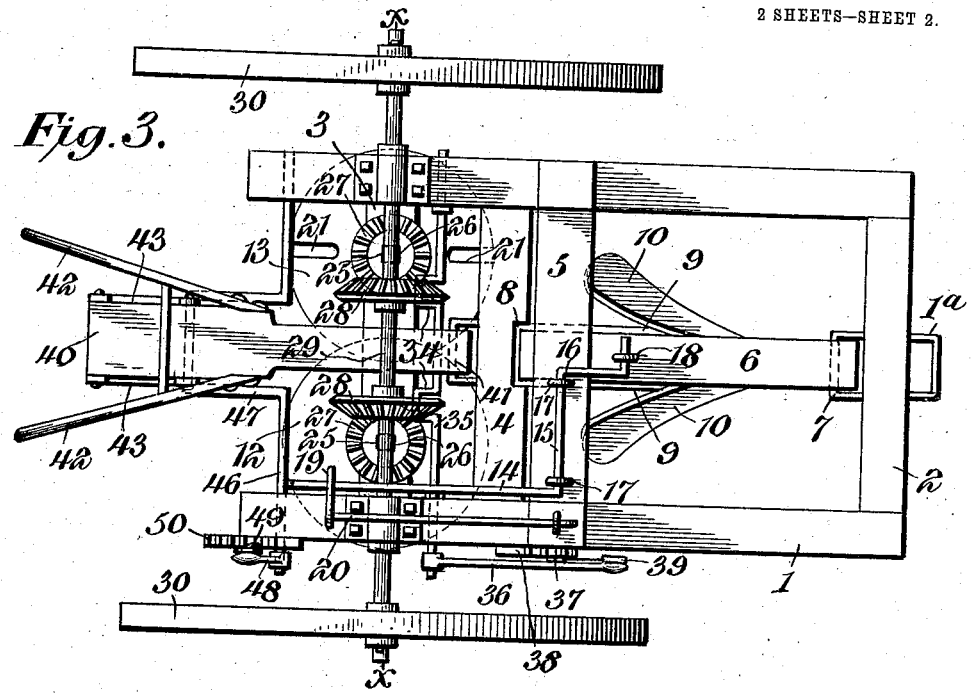
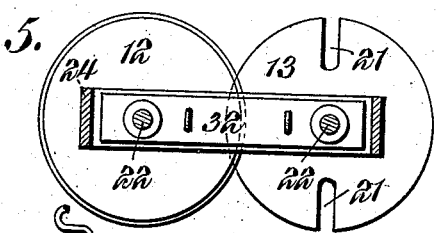
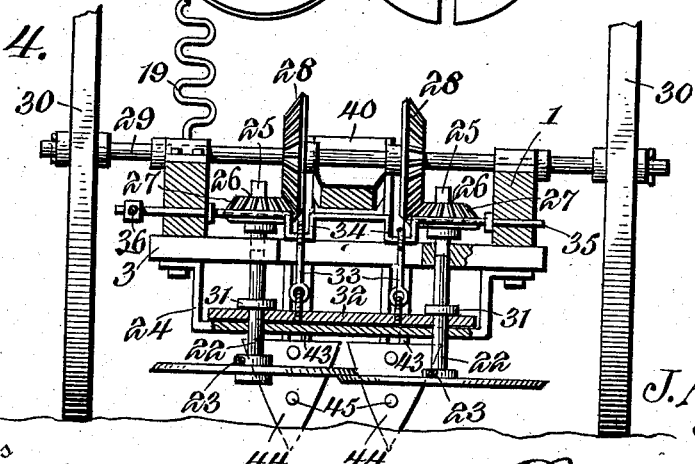
J. A. Fuller,
Inventor,

UNITED STATES PATENT OFFICE.

JAMES A. FULLER, OF ATLANTA, GEORGIA, ASSIGNOR OF ONE-HALF TO W. A. TEAT, OF ATLANTA, GEORGIA.

COTTON-CHOPPER.

No. 911,487.      Specification of Letters Patent.      Patented Feb. 2, 1909.

Application filed September 28, 1907. Serial No. 395,002.

*To all whom it may concern:*

Be it known that I, JAMES A. FULLER, a citizen of the United States, residing at Atlanta, in the county of Fulton and State of Georgia, have invented a new and useful Cotton-Chopper, of which the following is a specification.

The invention relates to improvements in cotton choppers.

The object of the present invention is to improve the construction of cotton choppers, and to provide a simple and comparatively inexpensive one capable of ready adjustment to suit the size of the cotton plants and the character of the soil, and adapted to remove the soil from each side of the cotton plants preparatory to thinning out the same and to guide the plants to the cutting means, whereby the plants may be accurately cut to the desired extent and the uncut plants left at regular intervals.

The invention also has for its object to enable the soil to be cultivated at each side of a row of cotton plants, and to provide means for throwing the soil towards the plants after the chopping operation has been completed.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

Figure 1:
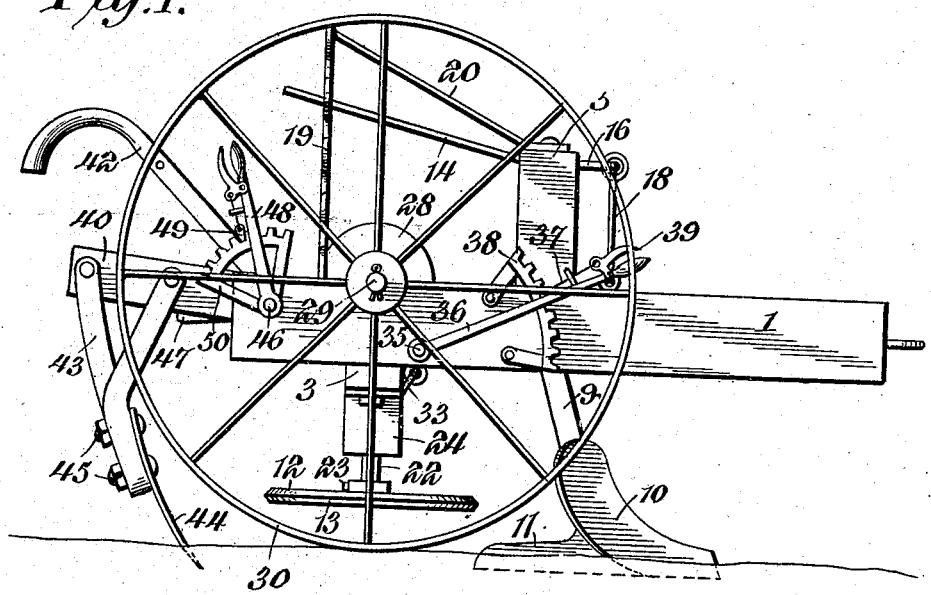
Figure 2:
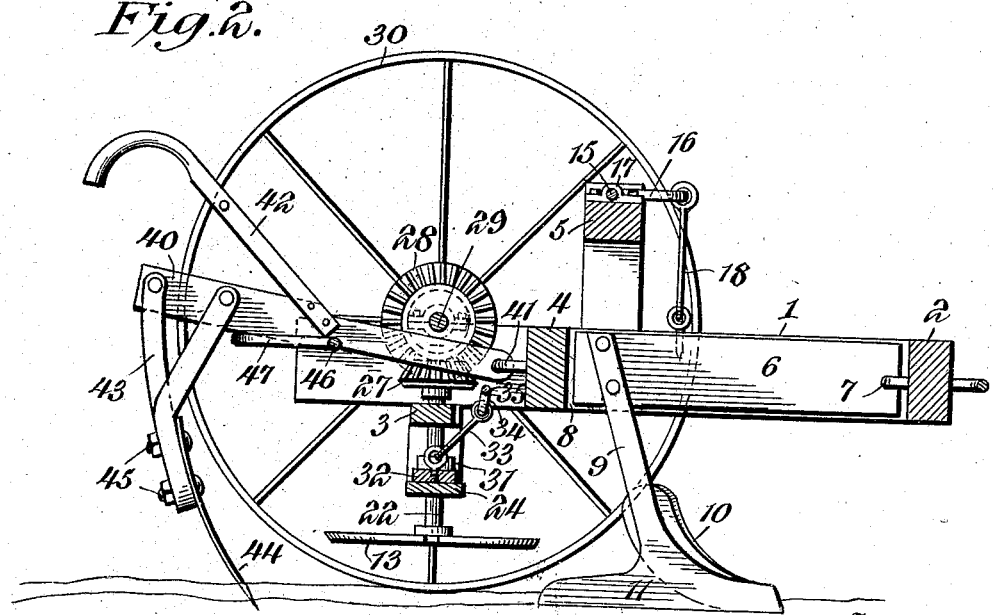

In the drawings:—Figure 1 is a side elevation of a cotton chopper, constructed in accordance with this invention. Fig. 2 is a longitudinal sectional view of the same. Fig. 3 is a plan view. Fig. 4 is a transverse sectional view, taken substantially on the line $x$—$x$ of Fig. 3. Fig. 5 is an enlarged detail view of the cotton chopping disks.

Like numerals of reference designate corresponding parts in all the figures of the drawings.

1 designates a substantially rectangular frame, provided at its front with a suitable clevis $1^a$ for the attachment of draft animals and composed of side bars and front, rear and intermediate transverse connecting bars 2, 3 and 4, and provided with an intermediate arched portion 5. The intermediate transverse portion 4 is located in rear of the center of the frame, and a front plow operates in the space between the front transverse bar 2 and the intermediate transverse bar 4. The beam 6 of the front plow is hinged at its front end to the front transverse bar 2 by means of a rectangular loop 7, extending rearwardly from the bar 2 and consisting of a transverse pintle portion and spaced side portions, as clearly shown in Fig. 3 of the drawings. This hinge connection permits the front plow to be raised and lowered to engage it with and disengage it from the ground. The rear end of the plow beam 6 is arranged in a guide 8, consisting of a recess formed in the front face of the intermediate bar 4, and adapted to hold the plow beam against material lateral movement. The front plow is provided with a pair of standards 9, secured at their upper ends to the opposite side faces of the standard 6 at the rear end thereof, and equipped at their lower ends with suitable plowshares, consisting of turning blades or mold boards 10 and extended landsides 11. The plows are spaced apart to receive a row of cotton plants, and the turning blades or mold boards are adapted to throw the soil from the plants and leave the latter on a ridge, and the extended landsides, which form straight guides are arranged for guiding the plants to a pair of horizontal chopping disks 12 and 13, whereby greater accuracy in the chopping operation is effected. The landsides 11 are extended rearwardly to points beneath the front edges of the horizontal chopping disks, so that the cotton plants are positively guided into engagement with the cotton chopping mechanism.

The front plow is raised and lowered by means of a lever 14, fulcrumed on the intermediate arch 5 and consisting of a transverse shaft or pivot portion 15, a front L-shaped arm 16, and a rearwardly extending operating arm. The intermediate pivot portion or shaft 15 is journaled in suitable bearings 17 of the arched portion 5, and is located at one side of the center thereof. The front L-shaped arm, which forms a crank, extends forwardly and is connected with a centrally arranged link 18, which is connected at its lower end with the plow beam 6, the latter being provided with an eye to receive the lower end of the link 18. The rearwardly extending arm or handle 14 is arranged to engage a vertical ratchet 19, consisting of a rod provided with a series of sigmoidal bends and secured at its lower end to the rear portion of one of the side beams, and provided at the top with a forwardly extending arm 20. The arm 20, which is secured to the intermediate arch 5 at one side thereof, serves as a brace for supporting the ratchet 19 in a vertical position. The intermediate arch 5 consists of vertical posts or pieces and a transverse connecting bar. The vertical ratchet is resilient, and the handle or arm of the operating lever is adapted to be readily engaged with and disengaged from the notches formed by the sigmoidal bends, whereby the front plow may be held in position for engaging the soil.

The cotton chopping disks 12 and 13 are provided with peripheral cutting edges and are beveled at their opposite faces, the disk 12 being beveled at its upper face, and the other disk 13 at its lower face to form the said cutting edges. When the machine is moved forward, the disks are rotated by the means hereinafter described, and they operate as shears in cutting or chopping the cotton plants. The disk 13 is provided with a plurality of recesses 21, which may be of any desired number and which interrupt the cutting edges of the disk 13 to leave uncut plants at regular intervals, and to cause the disks to cut down and thin out the intermediate plants. The disks are mounted on vertical shafts 22, and the disk 13 is detachably secured to the same by a set screw 23, or other suitable means to enable it to be removed when it is desired to change the distance between the plants left standing after the chopping operation. By employing a disk having a different number of recesses 21, such distances may be varied as will be readily understood. The vertical shafts are journaled in suitable bearing openings of the rear transverse bar 3, and a bearing bracket 24, composed of a transverse bottom portion and upwardly extending sides, which are bolted, or otherwise secured to the lower face of the transverse bar 3. The upper portions 25 of the vertical shafts are slidable in rectangular openings 26 of the horizontal beveled pinions 27, which mesh with vertical bevel gears 28. The vertical bevel gears are keyed, or otherwise secured to a transverse shaft or axle 29 on which the carrying wheels 30 are mounted, so that when the cotton chopper moves forward the gearing will be operated to rotate the cotton chopping disks 12 and 13. The cotton chopping disks are vertically movable to position them properly with relation to the plants to be operated on, and the vertical shafts are provided at points intermediate of their ends with collars 31, which engage the upper face of a lifting bar 32 having openings for the shafts, as clearly illustrated in Fig. 4 of the drawings. The lifting bar is connected by links 33 with crank bends 34 of a transverse crank shaft 35, journaled in suitable bearings of the sides of the main frame, and equipped at one end with an operating arm or handle 36. The operating arm or handle is provided with a dog or detent 37, arranged to engage a sigmoidal ratchet 38 and connected with a latch lever 39, located adjacent to the grip portion of the handle or arm 36. The transverse crank shaft 35 is adapted to be partially rotated to raise and lower the cotton chopping disks, which may be secured at any adjustment by the ratchet mechanism of the operating arm or lever 36. The cotton chopper is also provided with a rear plow, having spaced soil-engaging means adapted to cultivate the soil at opposite sides of the row of plants operated on by the cotton chopper, and designed to throw a portion of the soil towards the plants. The beam 40 of the rear plow is connected by a suitable hinge joint 41 with the rear face of the intermediate transverse bar 4 at the center thereof to permit the rear plow to swing upward and downward to lift it from the ground and to arrange it for operating on the soil. The rear plow is equipped with plow handles 42, and is provided at opposite sides with spaced standards 43 to which may be secured shovels 44, or any other suitable soil-engaging blades or devices to cultivate the soil and to throw the same to a greater or less extent towards the plants. The shovels 44 are detachably secured to the stadards 43 by bolts 45 to enable them to be removed, so that other soil-engaging devices may be used.

The rear plow is adapted to be supported by a rear crank shaft 46, having a central substantially U-shaped loop or bend 47, arranged to receive the plow beam 44 and adapted to support the same. The rear crank shaft 46 may be provided with a suitable operating handle 48, having a dog or detent 49 for engaging a ratchet 50. The loop 47 may be swung downward to a horizontal position, and the plow can then be controlled by the handles, if desired. The means for partially rotating the crank shaft 46 and securing the same at any adjustment enables the rear plow to be set in any position for engaging the soil and to be held above the ground when the front plow and the cotton chopping disks are elevated for transferring the machine from one field or place to another.

Having thus fully described my invention, what I claim as new and desire to secure by Letters Patent, is:—

1. In a cotton chopper, the combination with chopping mechanism provided with horizontally movable cutters, of spaced plows arranged in advance of the cotton chopping mechanism to ridge the cotton plants and provided with means carried by the plows and extending rearwardly therefrom to points beneath the cotton chopping mechanism to guide the plants until they are engaged by the said mechanism.

2. In a cotton chopper, the combination with chopping mechanism, of spaced plows arranged in advance of the chopping mechanism to ridge the cotton plants and provided with rearwardly extending landsides forming straight guides and terminating at their rear ends in the vertical plane of the cotton chopping mechanism for guiding the cotton plants to the same.

3. In a cotton chopper, the combination with horizontal cotton chopping disks, of spaced plows arranged in advance of the said disks and provided at their inner sides with landsides extended rearwardly and terminating beneath the cotton chopping disks for positively guiding the plants to the same.

4. In a cotton chopper, the combination of a frame, a horizontal shaft or axle, vertical gears mounted on the shaft, horizontal pinions meshing with the gears, vertical shafts slidable through the pinions and engaged by the same, a lifting bar extending across the space between and engaging the shafts, a crank shaft having loops connected with the lifting bar, and cotton chopping disks carried by the shafts.

5. In a cotton chopper, the combination of a frame, a horizontal shaft or axle, vertical gears mounted on the shaft, horizontal pinions meshing with the gears, vertical shafts slidable through the pinions and engaged by the same, said shafts being provided with collars, a lifting bar extending across the space between the shafts and engaging the collars, a crank shaft having loops connected with the lifting bar, and cotton chopping means carried by the shafts.

In testimony that I claim the foregoing as my own, I have hereto affixed my signature in the presence of two witnesses.

JAMES A. FULLER.

Witnesses:
LESLIE HUBBARD,
JOHN I. LINK.